Dec. 12, 1950 — E. V. KELLY — 2,533,815
FILTER RACK
Filed March 22, 1949
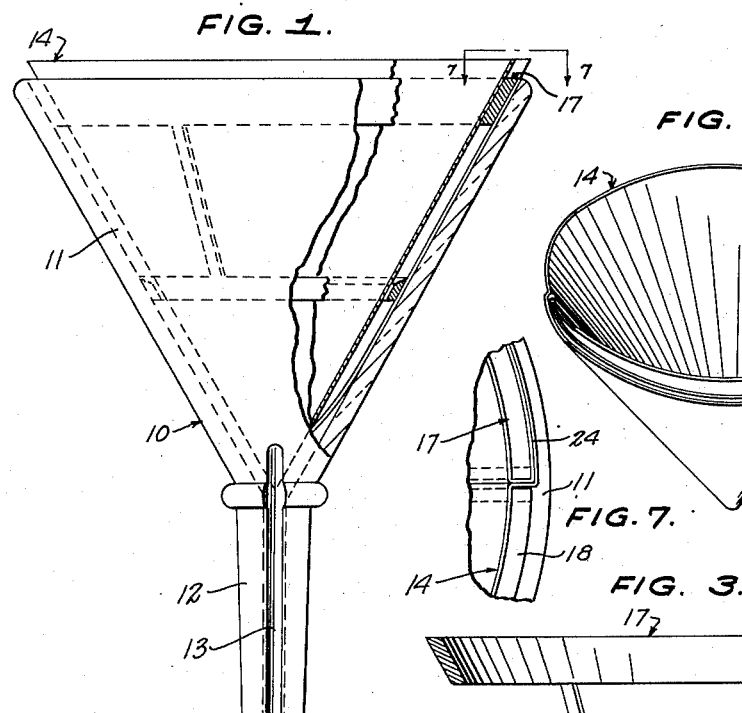
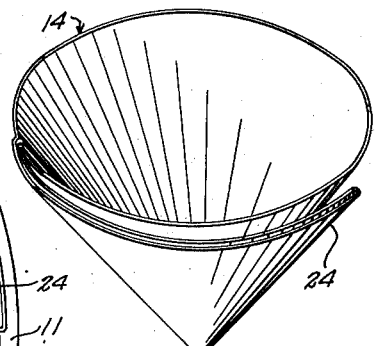
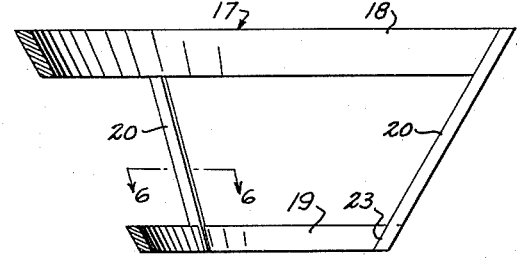
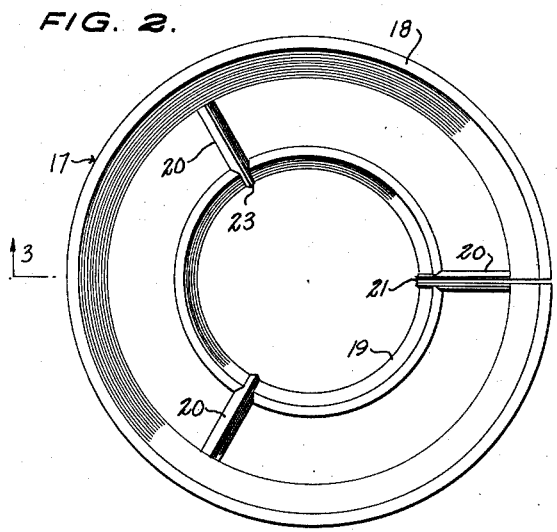
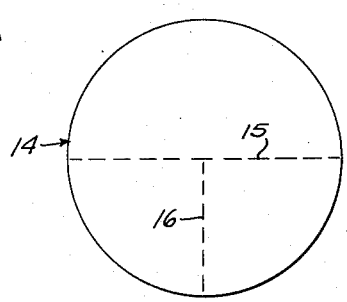
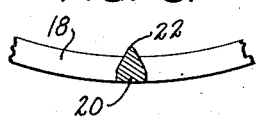
INVENTOR.
EDUARDO V. KELLY,
BY
McMorrow, Berman + Davidson
ATTORNEYS.

Patented Dec. 12, 1950

2,533,815

UNITED STATES PATENT OFFICE 2,533,815

FILTER RACK

Eduardo V. Kelly, Habana, Cuba

Application March 22, 1949, Serial No. 82,796

3 Claims. (Cl. 210—160)

This invention relates to filter racks and more particularly to a filter rack to be placed in a filtering funnel to hold a filter paper or tissue out of contact with the inner surface of the funnel during a filtering operation.

It is among the objects of the invention to provide an improved filter rack of simple and durable construction which is extremely economical to manufacture and may be formed of various materials, which materials may be selected with regard to inertness to the chemical solutions to be filtered as well as to strength and resiliency, which filter rack provides a minimum area of contact with the paper or tissue filter and maintains substantially the entire area of the filter spaced from the inner surface of the funnel so that there is a minimum obstruction to the flow of filterable material through the paper or tissue and into the funnel, and which is shaped to provide a free passage for filtered liquid downwardly through the funnel to the bottom end or neck of the latter.

Other objects and advantages will become apparent from a consideration of the following description and the appended claims in conjunction with the accompanying drawing wherein:

Figure 1 is a side elevation of a filter funnel with a paper filter and filter rack illustrative of the invention operatively disposed therein, a portion of the funnel, filter and rack being broken away and shown in cross section to better illustrate the construction thereof;

Figure 2 is a top plan view of the filter rack;

Figure 3 is a longitudinal cross section on the line 3—3 of Figure 2;

Figure 4 is a perspective view of a paper filter showing the manner in which a circular piece of filter paper is folded to produce a conical filter;

Figure 5 is a top plan view of a circular blank of filter paper or tissue indicating an initial stage in the folding of such blank to produce the conical filter illustrated in Figure 4;

Figure 6 is a transverse cross section of a fragmentary portion of the rack on the line 6—6 of Figure 3 and illustrating a structural detail of the rack; and Figure 7 is a top plan view of a fragmentary portion of the funnel, filter and rack illustrated in Figure 1 showing the manner in which the rack is applied to the filter.

With continued reference to the drawing, the funnel, generally indicated at 10, is a plain funnel of conventional construction having a conical body portion 11, the walls of which diverge at an angle of substantially 60° and the inner surface of which is plain, and a hollow or tubular neck 12 extending from the small end of the conical body 11 with its bore in communication with the interior of the body. A ridge 13 may be provided along the neck to facilitate the escape of air from a flask or other container having a neck in which the neck or stem 12 of the funnel is inserted.

The filter paper, generally indicated at 14, is also of conventional construction and comprises a circular piece or blank of paper or tissue of the desired porosity. These blanks may be folded or pleated in various ways to provide a conical filter receivable in the conical body of the filtering funnel but the simplest way is to first fold the blank in half, as indicated by the dotted line 15 in Figure 5, and to then fold one-half of the blank in half, as indicated by the dotted line 16 and then cup the blank in a manner to bring the two halves of the line 15 at opposite sides of the center of the blank substantially together with the half of the blank, including the line 16, doubled at the line 16 and overlying one side of the cup shape or conical filter, as is clearly illustrated in Figure 4. This provides a conical filter, one portion of the wall of which comprises three thicknesses of the filter paper. Such three thicknesses materially obstruct the flow of the filterable liquid through that part of the filter and, if the conical filter lies closely against the inner wall of the conical body of the funnel, flow of filterable liquid through the entire wall of the filter will be substantially obstructed and filtering will take place only near the apex of the conical filter. As this apex quickly becomes clogged with unfilterable material, an excessive amount of time is required to pass a quantity of solution through such filtering apparatus.

The filtering process is greatly facilitated and speeded up by the inclusion of the filtering rack, generally indicated at 17, between the conical filter 14 and the conical body 11 of the filter funnel.

The filter rack 17 is a thin walled body of truncated conical shape, comprising a flat, frusto-conical ring 18 at the larger end of the body, a smaller, frusto-conical ring 19 at the small end of the body and struts 20 extending longitudinal of the body at substantially equal angular intervals therearound disposed between and secured to the rings 18 and 19 to rigidly secure the rings together in spaced apart, substantially concentric relationship relative to each other.

The body 17 is provided in one side with a longitudinally extending narrow slot 21 which extends entirely through both rings 18 and 19 and longitudinally through one of the struts 20 substantially medially of the latter. Each of the struts 20 is of generally triangular cross sectional shape and the struts are so disposed that one edge of each strut is directed inwardly, as is clearly illustrated in Figure 2. These inwardly directed edges of the struts are preferably flattened or rounded, as indicated at 22 in Figure 6 to avoid any danger of tearing or puncturing the paper filter while, at the same time, providing a minimum area of the rack in contact with the outer surface of the filter. The areas of the filter between the rings 18 and 19 and between the struts 20 are held substantially out of contact with the inner surface of the conical body of the funnel so that filterable liquid may pass freely through these areas of the filter and into the funnel.

While three struts 20 have been illustrated and have been found to provide a device which is highly satisfactory in use, a greater number of struts may be used to reduce the extent of the areas between adjacent struts, without in any way exceeding the scope of the invention and the distance between the two rings 18 and 19 may also be varied as may be found convenient or desirable.

The small ring 19 has a wall thickness somewhat less than the wall thickness of the large ring 18 and of the struts 20 and the corresponding ends of the struts extend across the width of the small ring and project inwardly thereof, as indicated at 23 in Figures 2 and 3, so that the filter is held away from the inner ring between the adjacent end portions of the struts 20 and liquid passages are thus provided between the struts and between the smaller ring and the filter so that liquid passing through the filter into the funnel may flow downwardly past the smaller, lower ring and into the tubular neck 12 of the funnel.

When applying the folded filter, illustrated in Figure 4, to the rack, the doubled portion 24 of the filter is passed through the slot 21 in the rack and carried around the outside of the rack. This places the doubled or folded portion of the filter between the rack and the funnel and the entire portion of the filter surrounded by the rack is of only a single thickness so that passage of filterable liquids through the filter is further facilitated.

After the filter has been applied to the filter rack in the manner indicated above, the filter and rack are placed in the funnel, as illustrated in Figure 1 and a solution to be filtered may then be poured into the filter and the filter will be adequately supported substantially free of the funnel so that filterable liquids will quickly pass from the solution through the wall of the filter and downwardly through the neck of the funnel.

As stated above, the filter rack may be formed of any suitable material such as metal, wood, glass, porcelain, or synthetic plastic, a material preferably being selected which is inert to the chemical solution to be filtered.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A filter rack comprising a thin walled body of truncated, conical shape, including a large diameter ring at the large end of said body, a small diameter ring at the small end of said body and spaced from said large diameter ring, and struts spaced apart at substantially equal angular intervals around said body between and interconnecting said rings, said body having a narrow slot extending longitudinally thereof through both of said rings and longitudinally of one of said struts substantially medially of the latter.

2. A filter rack comprising a thin walled body of truncated, conical shape, including a large diameter ring at the large end of said body, a small diameter ring at the small end of said body and spaced from said large diameter ring, and struts spaced apart at substantially equal angular intervals around said body between and interconnecting said rings, said body having a narrow slot extending longitudinally thereof through both of said rings and longitudinally of one of said struts substantially medially of the latter, and the smaller of said rings having a wall thickness less than the corresponding thickness of said struts and said struts extending inwardly of said smaller ring to provide liquid passages along the portions of said smaller ring between said struts.

3. A filter rack comprising a thin walled body of truncated, conical shape, including a large diameter ring at the large end of said body, a small diameter ring at the small end of said body and spaced from said large diameter ring, and struts spaced apart at substantially equal angular intervals around said body between and interconnecting said rings, said body having a narrow slot extending longitudinally thereof through both of said rings and longitudinally of one of said struts substantially medially of the latter, and the smaller of said rings having a wall thickness less than the corresponding thickness of said struts and said struts extending inwardly of said smaller ring to provide liquid passages along the portions of said smaller ring between said struts, each of said struts having a substantially triangular cross sectional shape with one edge disposed inwardly of said body to contact a filter supported in said rack.

EDUARDO V. KELLY.

REFERENCES CITED

The following references are of record in the file of this patent:

UNITED STATES PATENTS

| Number | Name | Date |
|---|---|---|
| 1,111,249 | Courtwright | Sept. 22, 1914 |

FOREIGN PATENTS

| Number | Country | Date |
|---|---|---|
| 13,265 | Austria | of 1903 |